(12) United States Patent
Huinink et al.

(10) Patent No.: US 12,114,669 B2
(45) Date of Patent: Oct. 15, 2024

(54) BUNG DRILLER WITH A BUNG HOLDER

(71) Applicant: MAREL RED MEAT B.V., Lichtenvoorde (NL)

(72) Inventors: Maarten Christiaan Huinink, Lichtenvoorde (NL); Arno Hermanus Maria Ueffing, Lichtenvoorde (NL); Jaap Bernardus Giezenaar, Lichtenvoorde (NL)

(73) Assignee: MAREL RED MEAT B.V., Lichtenvoorde (NL)

( * ) Notice: Subject to any disclaimer, the term of this patent is extended or adjusted under 35 U.S.C. 154(b) by 128 days.

(21) Appl. No.: 17/913,303

(22) PCT Filed: Mar. 30, 2021

(86) PCT No.: PCT/EP2021/058266
§ 371 (c)(1),
(2) Date: Sep. 21, 2022

(87) PCT Pub. No.: WO2021/198237
PCT Pub. Date: Oct. 7, 2021

(65) Prior Publication Data
US 2023/0157306 A1 May 25, 2023

(30) Foreign Application Priority Data

Mar. 31, 2020 (EP) .................................... 20167278

(51) Int. Cl.
*A22B 5/00* (2006.01)
(52) U.S. Cl.
CPC .......... *A22B 5/0094* (2013.01); *A22B 5/0041* (2013.01)

(58) Field of Classification Search
CPC ........................... A22B 5/0094; A22B 5/0041
(Continued)

(56) References Cited

U.S. PATENT DOCUMENTS

| 4,023,237 A | 5/1977 | Meyn |
| 5,133,686 A | 7/1992 | Van Den Nieuwelaar et al. |

(Continued)

FOREIGN PATENT DOCUMENTS

| CN | 203482816 U | 3/2014 |
| CN | 203482817 U | 3/2014 |

(Continued)

OTHER PUBLICATIONS

Office Action from Chinese Application No. 202180019897.0, Dec. 5, 2022.
(Continued)

*Primary Examiner* — Richard T Price, Jr.
(74) *Attorney, Agent, or Firm* — Workman Nydegger

(57) ABSTRACT

A bung driller is provided for cutting free the anal opening and rectum end of an animal carcass by cutting around the anal opening and rectum end. The bung driller includes a longitudinal, drilling tube with an open cutting end, a mandrel centralized inside the drilling tube, and a bung holder located inside of the drilling tube and surrounding the mandrel. Contamination of skin surface and meat surface by fecal matter is a problem when cutting free the anal opening and rectum end of a carcass. The bung holder located inside of the drilling tube provides a holding force to the skin surface around the anal opening and makes a volume wherein fecal matter escaping from the intestine is caught.

15 Claims, 7 Drawing Sheets

(58) Field of Classification Search
USPC .......................................................... 452/122
See application file for complete search history.

(56) References Cited

U.S. PATENT DOCUMENTS

| | | | |
|---|---|---|---|
| 5,199,922 A | | 4/1993 | Korenberg et al. |
| 5,580,304 A | * | 12/1996 | Bleth .................... A22C 21/06 |
| | | | 452/122 |
| 5,688,164 A | * | 11/1997 | Mills .................... A22B 5/0094 |
| | | | 452/122 |
| 5,741,176 A | * | 4/1998 | Lapp ..................... A22C 21/06 |
| | | | 452/122 |
| 6,190,250 B1 | | 2/2001 | Volk et al. |
| 6,193,595 B1 | | 2/2001 | Volk et al. |
| 6,641,475 B1 | * | 11/2003 | Nielsen ................ A22B 5/0094 |
| | | | 452/109 |
| 7,905,897 B2 | * | 3/2011 | Whitman ........... A61B 17/3476 |
| | | | 606/172 |
| 8,858,306 B2 | * | 10/2014 | Criscione, II ........ A22B 5/0082 |
| | | | 452/173 |
| 2017/0049116 A1 | | 2/2017 | Driscoll |
| 2018/0042247 A1 | | 2/2018 | López |

FOREIGN PATENT DOCUMENTS

| | | |
|---|---|---|
| EP | 0450730 A1 | 10/1991 |
| EP | 0460740 A1 | 12/1991 |
| EP | 0722666 A1 | 7/1996 |
| EP | 0820697 A2 | 1/1998 |
| EP | 1056347 B1 | 5/2004 |
| EP | 3278670 A1 | 2/2018 |
| EP | 3335566 A1 | 6/2018 |
| NL | 1013952 C1 | 6/2001 |
| WO | 9206597 A1 | 4/1992 |
| WO | 2013119106 A1 | 8/2013 |

OTHER PUBLICATIONS

Search Report from Chinese Application No. 202180019897.0 Nov. 29, 2022.
Search Report from corresponding European Application No. 20167278.9, Sep. 21, 2020.
International Search Report from PCT Application No. PCT/EP2021/058266, Jun. 23, 2021.
Chinese Search Report from Corresponding Chinese Patent Application No. CN202180019897.0, Jun. 26, 2023.
Chinese Office Action from Corresponding Chinese Patent Application No. CN202180019897.0, Jun. 27, 2023.

* cited by examiner

BUNG DRILLER WITH A BUNG HOLDER

FIELD OF THE INVENTION

The present invention relates to a bung driller for drilling around and releasing the bung or rectum end of an animal carcass, such as pigs.

BACKGROUND OF THE INVENTION

When processing slaughtered animals e.g. pig carcasses it is important to avoid or significantly reduce the risk of contaminating the meat with the substances being located in the stomach and the intestines such as fecal matter. The attachment of the intestines to the skin at the anal opening may be cut and the intestine end (the rectum end), may be handled e.g. closed during the further processing of the carcass until the viscera can be released fully and removed from the carcass. Bung drillers can be used to cut the skin and the underlying structure around the anal opening.

Bung drillers may comprise a cutting edge at the end of a drilling tube, where a mandrel is centralized in the drilling tube. When in function, the tip of the mandrel is entered into the bung (anal opening and part of the rectum) and the cutting edge cuts around the anal opening and the rectum end. Different types of bung drillers exist.

In WO2013119106 (A1) a rectal cutting device is described which comprises a cutting member rotatably mounted on a carrying member, which cutting member comprises a cylindrical wall portion surrounding an interior space, wherein the cylindrical wall portion has a top end with a cutting edge; a centring mandrel arranged coaxially within the cylindrical wall portion, a free end of which reaches past the cutting edge; rotation driving means for rotating the cutting member with respect to the carrying member, and suction means for creating a vacuum inside the interior space of the cutting member, having an axially movable ejecting member within the interior space of the cutting member and ejection driving means for axially moving the ejecting member. In the cutting step, the cutting member is activated and driven to rotate such that is cuts through the tissue surrounding the rectum end portion. In this process, the carrying member is displaced such as to move the cutting member deeper into the tissue. During cutting, the suction means maintain a vacuum in the inner interior space portion of the cutting member, which vacuum is transferred to the outer interior space portion by air being sucked past the flexible membrane. Parts of the rectum end portion being cut loose are thereby sucked into said outer portion of the interior space. The cutting process is continued until the rectum end portion has been cut loose along its complete length.

Vacuum in the prior art bung drilling process is used to provide a holding force on the skin inside the cutting device such that the knife is capable of cutting into the skin hereby avoiding the drilling tube presses onto the skin instead of cutting into the skin. However, the vacuum effect may result in the anal opening is opened or turned inside out such that faeces is released from the rectum and gets in contact with the skin surrounding the anal opening from where micro organisms can be spread. Hereby the risk of contamination of meat is increased.

DESCRIPTION OF THE INVENTION

It is an object of embodiments of the invention to provide an improved bung drilling device especially for reducing risk of contamination such as reducing the turning inside out of the anal opening. It is a further object of embodiments of the invention to provide an improved method of cutting free the bung from a carcass.

According to a first aspect, the invention relates to a bung driller for cutting free the anal opening and rectum end of a carcass by cutting around the anal opening and rectum end, the bung driller comprises:

A longitudinal drilling tube capable of holding a pressure difference relative to the outside, and with an open cutting end, A mandrel centralized inside the drilling tube, and A bung holder located inside of the drilling tube and surrounding at least a part of the mandrel.

Carcasses may be from any slaughtered animals preferably slaughtered at an abattoir. The animals may be e.g. pig, poultry, cattle/cows, goats, sheep etc. Preferable the bung driller is for pig carcasses.

The drilling tube is capable of holding a pressure difference relative to the outside, which means when the drilling tube is in contact with a carcass a pressure difference may be established for a volume inside the drilling tube and the outside and such a pressure difference can be held. To establish such a pressure difference the drilling tube may be 'intact' or air-tight meaning without openings or incisions in the tube body (tube wall), however, smaller openings or incisions may be present in the wall of the drilling tube and the drilling tube may still be capable of holding a pressure difference relative to the outside, such incisions may be located in the cutting blade making the cutting blade more aggressive. A pressure difference may be obtained if e.g. a vacuum is established inside the drilling tube. By being capable of holding a pressure difference, the drilling tube may define a volume also capable of keeping any contaminations from leaving the volume inside the drilling tube.

In the front end of the drilling tube the cutting end comprises an annular cutting blade which preferably is intact or unbroken, such as not being a saw.

In an embodiment the bung holder is circular or cup-shaped around the mandrel and has an overall outer diameter smaller than an inner diameter of the drilling tube. In a further embodiment there is space between the outer diameter of the bung holder and the inner diameter of the drilling tube, hereby making a space between the outside of the bung holder together with part of the mandrel on the one side and the inside of the drilling tube on the other side. In a preferred embodiment the bung holder has an entire surface without openings towards the inside of the drilling tube. The bung holder is open in the region towards the open cutting end of the drilling tube. The bung holder preferably makes an inner volume separate from the remaining volume inside the drilling tube, hereby providing two different volumes capable of encircling possible contaminants and reducing spread of contaminants especially from the volume inside the bung holder to the volume inside the drilling tube.

In an embodiment the bung holder has holding means capable of engaging with the outside of the carcass. The holding means may be located at the edge of the cup-shaped bung holder i.e. between the closed and the open part of the bung holder. The bung holder's holding means are capable of engaging with the outside of the carcass i.e. with the skin area surrounding the anal opening of a carcass. The holding means of the bung holder are capable of holding the skin such that it does not turn when the bung driller is drilling into the skin and into the carcass where the drilling process provides turning forces to the skin surface. Another function of the holding means is to secure the anal opening of the carcass can not turn inside out e.g. when a vacuum may be made inside the drilling tube during drilling. Hereby at least the main part of fecal matter is kept inside the rectum. In another embodiment the holding means of the bung holder comprises teeth or other structures capable of engaging with the skin surface of the carcass. The function of the teeth are to obtain a good grip of the skin and not to cut into the skin except for any cutting to obtain the good grip. The teeth may have any form suitable to engage with the skin of a carcass, such as pointed.

In an embodiment the bung holder is configured to rotate around the mandrel. In another embodiment the bung holder can slide in axial direction within the drilling tube. The bung holder is preferably capable to rotate relative to the drilling tube and can be non-turning during the drilling process. In a preferred embodiment the bung holder and the mandrel are connected such that they can slide axially inside the drilling tube. Hereby the bung holder may be located in a fixed position according to a longitudinal direction of the mandrel, though the bung holder may still slide around the mandrel.

In an embodiment the bung holder is air tight towards the inside of the drilling tube, hereby the bung holder defines a first volume inside of the bung holder, and this first volume can be a closed volume when the holding means engage with the outside of a carcass. Thus the bung driller may be constructed with a first volume located between the outside of the carcass skin, the outside of the mandrel and the inside of the bung holder. This first volume encircles the mandrel just outside the anal opening and part of the carcass skin surrounding the anal opening. In an embodiment of the bung driller the circular mandrel is a rod or tube with a closed end or tip located towards or in the region of the open end of the drilling tube. The mandrel may be axially moved according to the drilling tube such that the closed end or tip may be located inside the drilling tube or in front of the drilling tube. In another embodiment the mandrel is hollow and has openings in a region of the closed end, such as in a region between the closed end of the mandrel and the bung holder, such as between the closed end of the mandrel and the part of the bung holder making up the boundary towards the inside of the drilling tube, such that openings may be located along the mandrel and/or inside the first volume of the bung holder. In an embodiment the mandrel has a non-filled or open inner volume and openings at least in part of the region towards the closed end. Preferably no openings are located at the outermost end or tip of the mandrel, such as within the outermost 0.5 cm, 1 cm, 1.5 cm, or 2 cm.

In an embodiment of the bung driller the mandrel is connected to a suction means for making vacuum inside the first volume of the bung holder and/or inside a second volume of the drilling tube when the bung driller is in function. The second volume is the volume outside of the bung holder and inside of the drilling tube i.e. between the bung holder and the drilling tube. Vacuum inside the second volume may also be performed by suction means inside the drilling tube. Suction means may be capable of aspirating air away from and thus creating vacuum inside the mandrel and/or inside the drilling tube and/or inside the bung holder.

Air valves may be located in the bung holder between a first volume inside the bung holder and a second volume inside the drilling tube. Such air valves may be capable of letting air e.g. including contaminants being aspirated from the first volume to the second volume or from the second volume to the inner volume of the mandrel. The air flow direction through air valves located in the bung holder may be determined by the location of suction means connected to the mandrel to aspirating air away from the volume inside the mandrel or suction means connected to the drilling tube aspirating air away from the second volume.

In an embodiment openings in the mandrel are made such that these are located in the area located inside the bung holder i.e. at the first volume and located in the area which is directed into the intestine or rectal end of a carcass to process. Preferably the outer tip of the mandrel does not include openings.

In an embodiment openings, are located along a region of the mandrel, such as located in ring-shaped positions around the mandrel. The openings may be located along the mandrel, such as in a region nearby the front end, 2 to 10 of the ring-shaped positions with openings may be present, such as 4-8, e.g. 5-7, such as 6 ring-shaped position. Each ring-shaped position may comprise 4-8 openings, such as 6 openings. The size of the openings can be determined in accordance to the type of carcass to process. A gripping effect of the intestine or rectum end is obtained when the vacuum is established, a vacuum inside the bung holder i.e. in the first volume may also be created.

Bung drillers for processing animal carcasses are known to the person skilled in the art. For this reason the person skilled in the art knows the material of the different units of the bung driller is preferably of material such as metal approved for use at abattoirs and the material is capable of being cleaned frequently, such as after each use. Parts or units of the bung driller may be made of a polymeric material, such as bearings. The overall design and function of bung drillers are known and need not be described here.

A second aspect of the invention relates to a method for cutting free the anal opening and rectum end of an animal carcass by cutting around the anal opening and rectum end with a bung driller as described herein, the method comprises entering a leading end of the mandrel into the anal opening and the rectum end of an animal carcass, creating contact between the bung holder and skin surrounding the anal opening of the carcass, drilling around the anal opening and along a part of the rectum end of the carcass with a cutting blade of the drilling tube, at least during the drilling creating a first volume inside the bung holder and creating a second volume inside the drilling tube and outside the bung holder, avoiding faeces entering from the first volume into the second volume.

In a preferred embodiment the method may be performed by a bung driller as described herein. In a more preferred embodiment the bung driller includes suction means capable of aspirating air away from inside the mandrel and/or from inside the drilling tube and/or from inside the bung holder. In a more preferred method air is aspirated from the first volume to the second volume or from the first volume to the inside of the mandrel. Even more preferred is a method where suction means are aspirating air away from only the volume of the mandrel, this volume being in contact with the first volume and/or the second volume. The different functions of the bung drillers described herein are described in the descriptions of the figures.

In one embodiment the function of the bung driller is without making a vacuum inside the bung driller. In another embodiment of the method vacuum is made in the second volume inside the drilling tube. In a further embodiment of the method vacuum is made in the first volume inside the bung holder. Vacuum is preferably made in the first volume by making vacuum in the inner volume of the mandrel. In another embodiment of the method vacuum is made in the first volume and in the second volume.

In an embodiment of the method the cut free rectum end is dropped or otherwise delivered to the inside of the carcass.

In an embodiment of the method wherein the anal opening and the rectum end has been cut free, vacuum is kept in the first volume and/or in the second volume inside the bung holder. Hereby the rectum end is withheld inside the drilling tube and the bung driller holding the rectum end can be removed from the carcass and the rectum end can be delivered to a location outside and nearby the carcass for further processing, such as wrapped in a closing material.

A third aspect of the invention relates to a bung drilling system comprising
- a robot with at least one industrial manipulator, such as a robot arm,
- at least one bung driller as described herein connected to the at least one industrial manipulator,
- at least one vision system for obtaining image data of a carcass in the region of the outside of the anal opening,
- at least one processor for processing obtained image data and configured to compute controlling information based on information including image data,
- at least one controlling device configured for obtaining at least controlling information from the at least one processor, and for controlling the at least one industrial manipulator such as at least one robot arm and the at least one bung driller to process an animal carcass.

Different items may be included in the bung drilling system as e.g. robot, industrial manipulator, robot arm, vision system, processor and controlling device. The persons skills in the art are aware of such different systems and the way they should be connected to configure the system to obtain image data, process such data and control the robot or robot arm to process an animal carcass as described herein with a bung driller. The number of axis or degree of freedom in which the industrial manipulator is capable of working may be dependent on the set up e.g. whether the animal carcass is under transport or not during the process e.g. from the time the system starts identifying the location of the anal opening to the bung driller is removed after the drilling process. Thus the industrial manipulator may dependent on the set up be an industrial manipulator working in a number of degree of freedom being 1, 2, 3, 4, 5, 6. Preferred is at least 2 degree of freedom, such as at least 4 degree of freedom.

Different information may be obtained from the image data such as information relating the position and size of e.g. the anal opening, the tail, gender etc., which can be included in the image processing and based on which it can be computed where the bung driller is to be positioned to cut around the anal opening and how the industrial manipulator should be controlled.

In an embodiment of the system the industrial manipulator may be capable of working in e.g. 3 degree of freedom, such as 5 degree of freedom, such as being a 6-axis robotic manipulator.

In an embodiment of the system this system comprises at least one cleaning cabinet for cleaning the bung driller after use. Preferably such a cleaning cabinet comprises water connection, soap applicator, heating device and/or drying device. Water may be applied in a hot connection through a water connection and hereby heating device and soap applicator may be located outside the cleaning cabinet. The person skilled in the art knows of the requirement of cleaning devices at abattoirs.

In an embodiment of the system the at least one cleaning cabinet is connected to the the at least one industrial manipulator such as a robot arm. Hereby one industrial manipulator or robot arm can hold at least one bung driller and a cleaning cabinet, wherein the bung driller can be cleaned after having been in contact with a carcass.

In an embodiment of the system at least one industrial manipulator or robot arm comprises at least two bung drillers and at least one cleaning cabinet. In this design one industrial manipulator or robot arm can hold two bung drillers and a cleaning cabinet, wherein a bung driller can be cleaned after having been in contact with a carcass, and such that when one bung driller is cleaned the other bung driller may be in function.

More than two bung drillers may be located on one industrial manipulator or robot arm, such as e.g. three or four. This may be combined with one, two or three cleaning cabinets.

In an embodiment of the system two industrial manipulators such as robot arms each holding at least one bung driller are located in the system.

In an embodiment of the system a stationary knife may be located in the system for cutting meat at the ventral side of the anal opening. Such a cut may be performed before removing the bung from the carcass by pulling the cut free bung to the belly side of the carcass.

Features described herein in respect of any of the aspects or figures may be combined with embodiments of other aspects.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
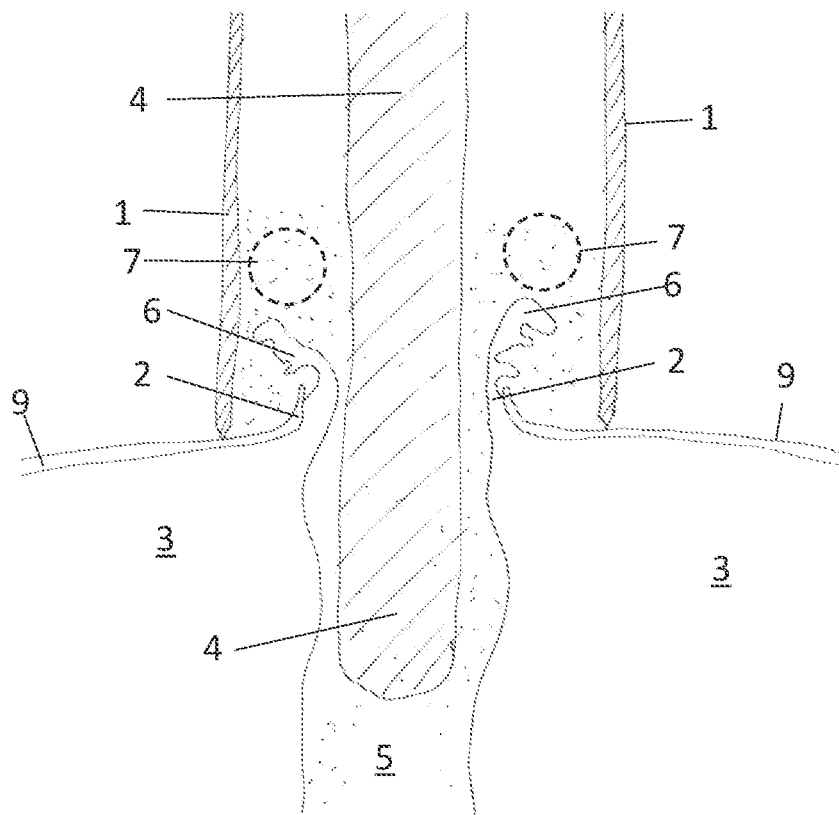
FIG. 1 illustrates a prior art method for bung cutting.

FIG. 1 illustrates a prior art method for bung cutting. A bung driller 1 is located outside and around an anal opening 2 of a carcass 3. A front end of a mandrel 4 of the bung driller 1 is located in the intestines/rectum end 5 of an animal carcass. Inside the bung driller 1 vacuum (not illustrated) is established to secure the skin 9 of the carcass 3 is not pressed into the carcass 3 by the force applied to the skin 4 by the bung driller 1 during cutting. Normal i.e. atmospheric pressure (not illustrated) is present on the skin 9 outside of the bung driller 1 and normal pressure is also present inside the carcass 3. Due to the vacuum inside the bung driller 1, the intestinal wall 6 may be sucked into the bung driller 1 and hereby turned inside out and opened, such that manure 7 (illustrated encircled) escape from the intestine 5 and into the space inside the bung driller 1, where it contaminates the skin 9 located inside the bung driller 1.

Figure 2:
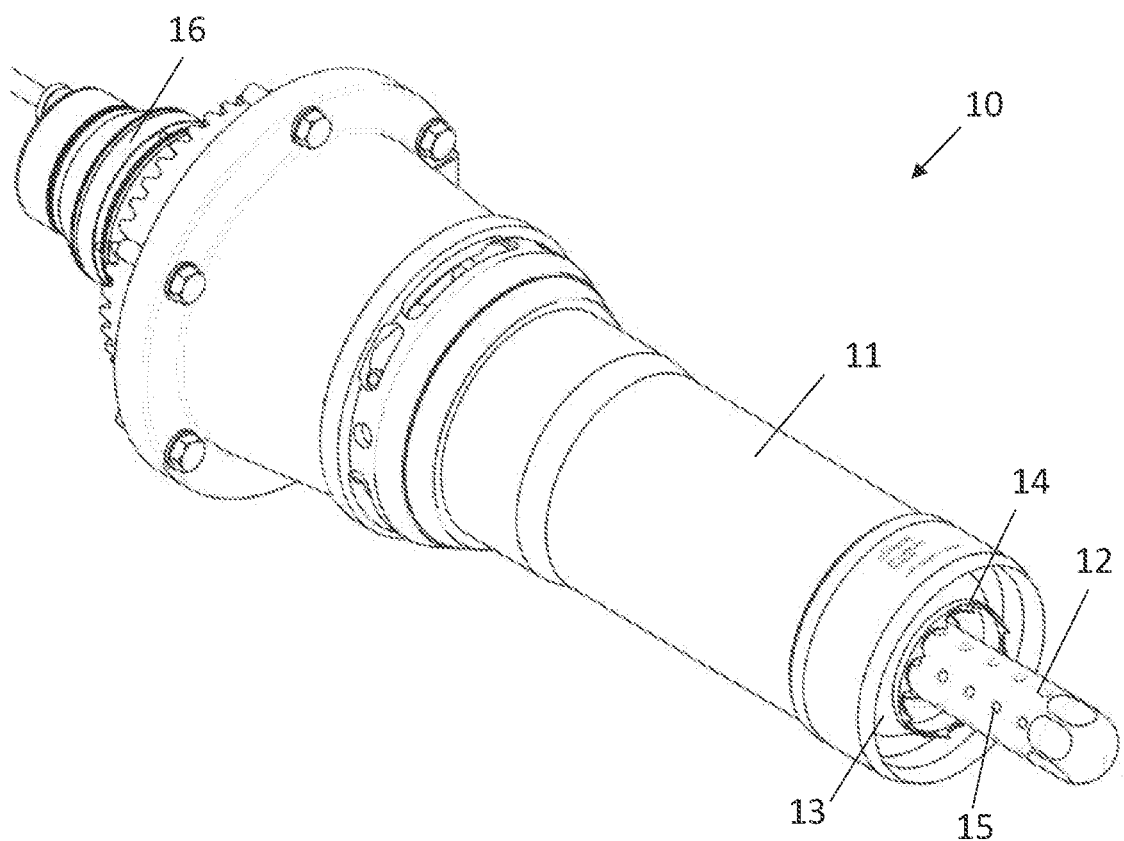
FIG. 2 illustrates a bung driller according to the present invention.

FIG. 2 illustrates a perspective view of a bung driller 10 according to the present invention. Illustrated is a drilling tube 11 surrounding a mandrel 12 and in between these a bung holder 13 is located. The bung holder 13 has teeth 14 capable to engage with the skin around an anal opening of a carcass. Openings 15 are located in the mandrel 12. The bung driller 10 can be mounted to a robot tool (not illustrated) at the rear end 16.

Figure 3:
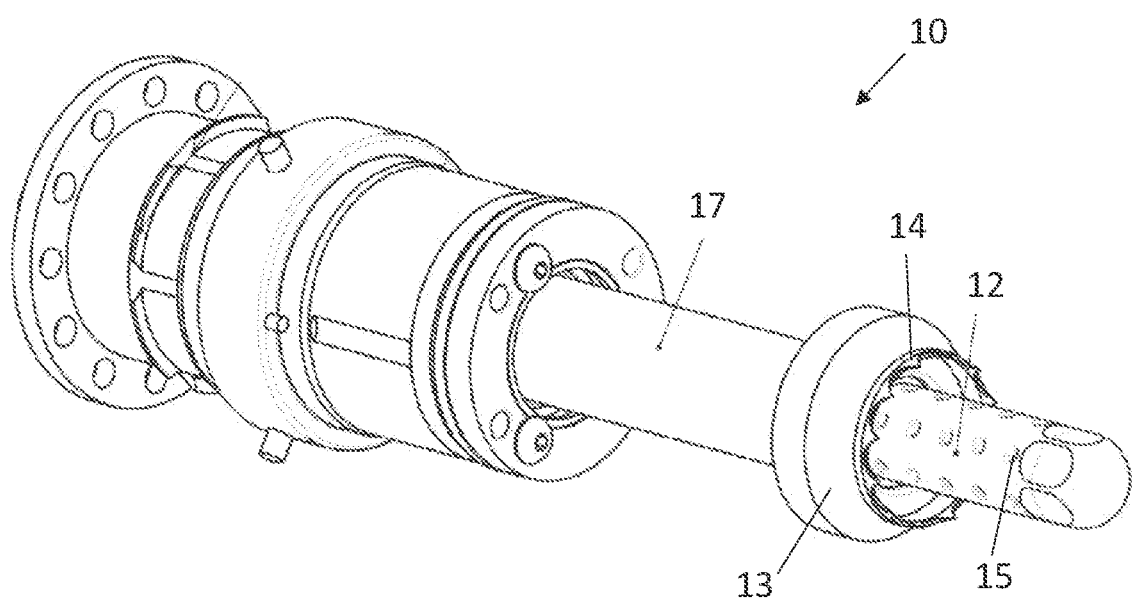
FIG. 3 illustrates the bung driller without the drilling tube.

FIG. 3 illustrates the bung driller 10 of FIG. 2 without the drilling tube 11. Illustrated is the mandrel 12 with openings 15, a bung holder 13 with teeth 14. The bung holder 13 is connected to a tube-formed piston 17 positioned around the mandrel 12.

Figure 4:
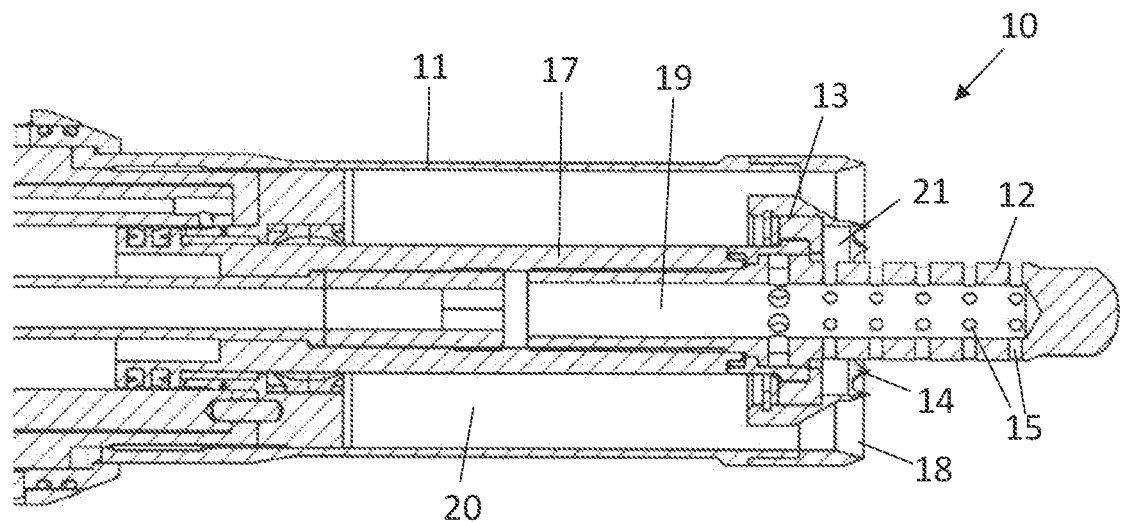
FIG. 4 illustrates a longitudinal cut through the bung driller.

FIG. 4 illustrates a longitudinal cut through the bung driller 10 according to the present invention. Illustrated is a drilling tube 11 surrounding a mandrel 12 and in between these a bung holder 13 is located attached to a piston 17. The bung holder 13 has teeth 14 capable to engage with the skin around an anal opening of a carcass. Openings 15 are located in the mandrel 12. Illustrated is also the cutting blade 18 or edge of the drilling tube 11, a volume 19 inside the mandrel 12 and a second volume 20 inside the drilling tube 11. A first volume 21 is located inside the bung holder 13, where a vacuum preferably can be established independently of a vacuum in the second volume 20 when the bung driller is in function. The rear most openings in the mandrel (i.e. openings inside the bung holder) where the end of the mandrel is the front part, are preferably connected to the second volume 20. As described elsewhere suction means (not illustrated) can be connected to the mandrel and/or to the drilling tube aspirating air away from the volume inside the drilling tube and/or from the second volume 20 inside the drilling tube.

Figure 5:
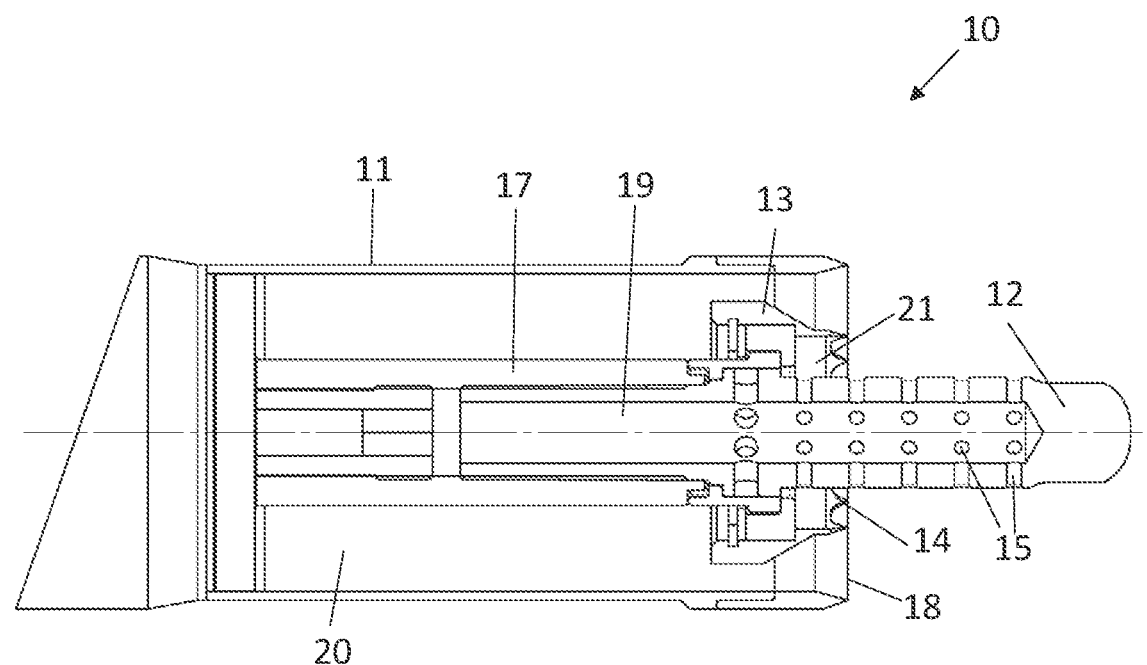
FIG. 5 illustrates the bung driller with the mandrel in a forward position.

FIG. 5 illustrates a longitudinal cut through the bung driller 10 with the mandrel 12 in a forward position. In this position the bung driller 10 is ready to be inserted into an anal opening of a carcass, where the part of the mandrel 12 outside i.e. in front of the drilling tube 11 can the inserted into the anal opening. This is preferably performed without any vacuum in the bung driller 10. The teeth 14 if present of the bung holder 13 is in a position ready to engage with the skin surface around the anal opening of a carcass. A first volume 21 is located inside the bung holder 13, where a vacuum can be established independently of a vacuum in the second volume 20 when the bung driller is in function.

Figure 6:
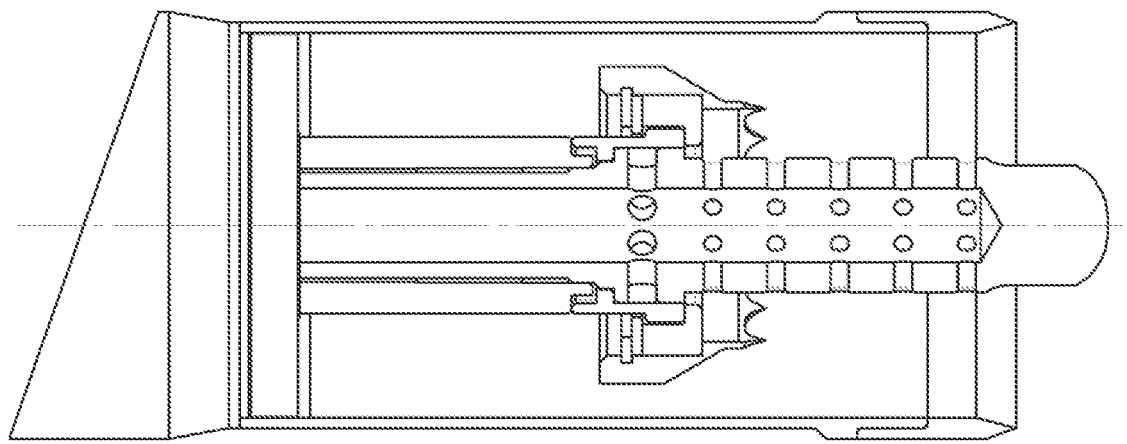
FIG. 6 illustrates the bung driller with the mandrel in a middle position.

FIG. 6 illustrates the bung driller 10 of FIG. 5, with the mandrel 12 in a middle position. This is a position where the cutting blade 18 of the drilling tube 11 is cutting into the carcass around the anal opening and rectum end. Cutting is performed by rotation of the drilling 11 by a motor (not shown), and vacuum may be made in the first volume and/or in the second volume.

Figure 7:
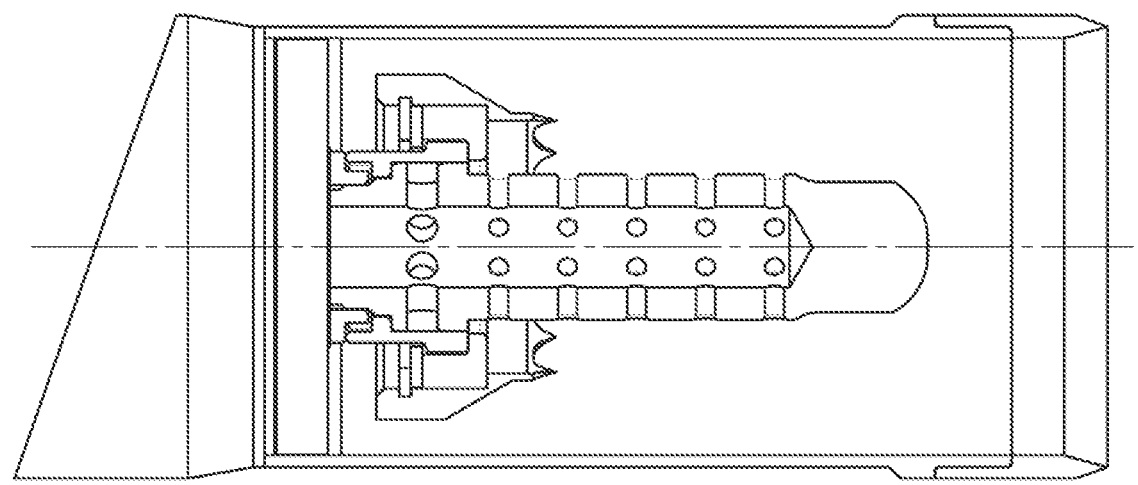
FIG. 7 illustrates the bung driller with the mandrel in a retracted position.

FIG. 7 illustrates the bung driller 10 of FIGS. 5 and 6, with the mandrel 12 in a retracted position. This is a position where the cutting around the anal opening and rectum end is finalised inside the carcass. The cut free rectum end may be dropped inside the carcass by stopping the suction (if present on the bung driller) and hereby eliminate the vacuum. However, the cut free rectum end may also be withheld inside the drilling tube 11 by the vacuum and the rectum end may be pulled out of the carcass together with the drilling tube 11 and handled outside the carcass.

Figure 8:
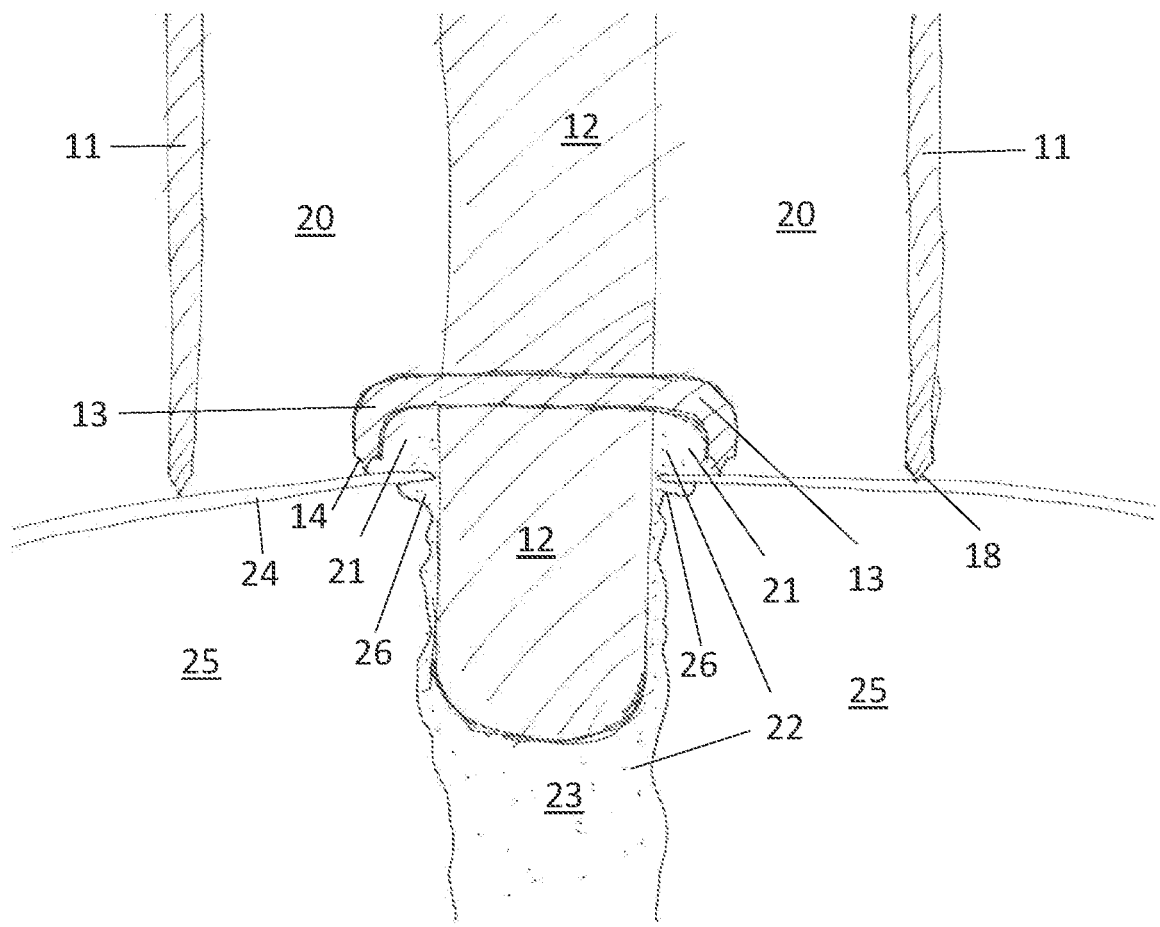
FIG. 8 illustrates a bung drilling method without vacuum.

FIG. 8 illustrates a bung drilling method performed without vacuum. Illustrated is a situation just before the drilling tube 11 is to start drilling into the skin 24 and thereafter into the carcass 25 around the anal opening or intestine wall 26 and the intestine/rectum end 23. In this situation the cutting blade 18 is located onto the skin 24 outside the carcass 25. The tip of the mandrel 12 is entered into the anal opening surrounded by the intestine wall 26 and into the intestine/rectum end 23 such that the teeth 14 of the bung holder 13 are located onto the outside of the skin 24 of the carcass 25. A first volume 21 is established inside the bung holder 13 towards the skin 24 and is encircling the mandrel 12. A second volume 20 is established outside the skin 24 of the carcass 25 and between the bung holder 13 and the drilling tube 11, where the drilling tube 11 surrounds the bung holder 13, hereby the second volume 20 encircles the bung holder 13 and part of the mandrel 12. There is no openings in the bung holder 13 which the fecal matter 22 can pass, and hereby the first volume 21 and the second volume 20 are separated from each other. Fecal matter 22 is illustrated by small dots inside the intestine/rectum end 23, around the tip of the mandrel 12 and in the first volume 21 established by the bung holder 13. A first function of the bung holder 13 is to perform a force to the outside of the skin 24 such that the edge of the anal opening i.e. the intestine wall 26 at the skin 24 level does not turn inside out and letting amounts of fecal matter 22 escape from the intestine/rectum end 23 by passing by the tip of the mandrel 12 and out through the anal opening. A second function of the bung holder 13 is to keep fecal matter 22 that may escape through the anal opening inside the first volume 21 such that the skin 24 area which may be contaminated by fecal matter 22 is very much reduced compared to prior art systems. Though the method is described to be performed without vacuum, it can be improved by including suction means to aspirate air away from the second volume 20. Such a vacuum created to the outside of the skin 24 increases the quality of the cut by making a cleaner cut around the anal opening and the rectum end.

Figure 9:
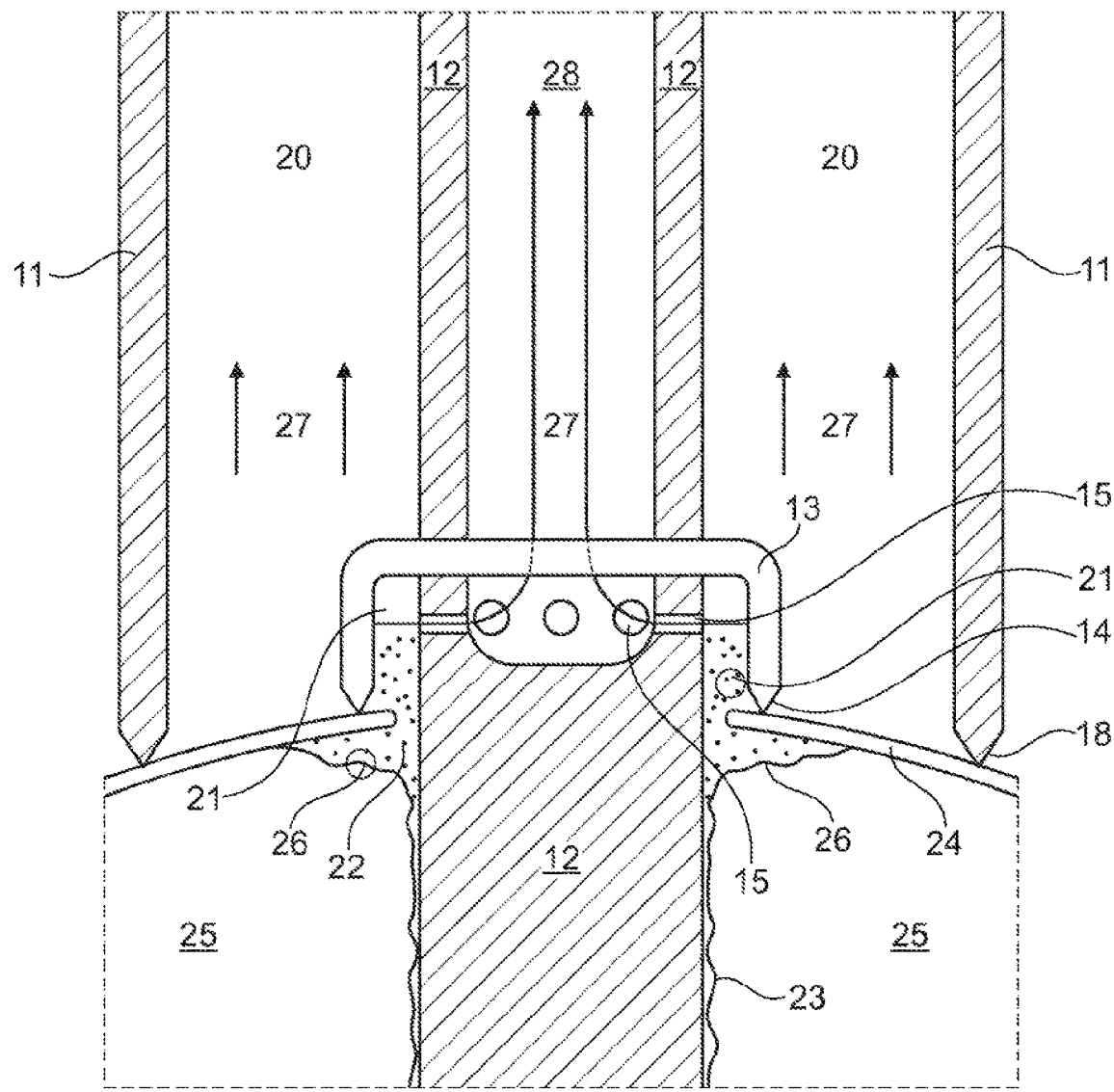
FIG. 9 illustrates a bung drilling method with vacuum.

FIG. 9 illustrates a bung drilling method performed with vacuum. The method with vacuum can be performed in three different ways. Illustrated is a similar situation as in FIG. 8 i.e. just before the drilling tube 11 is to start drilling into the skin 24 and thereafter into the carcass 25 around the anal opening and intestine/rectum end 23. In this situation the cutting blade 18 is located onto the skin 24 outside the carcass 25. The tip of the mandrel 12 is entered into the anal opening and into the intestine/rectum end 23 such that the teeth 14 of the bung holder 13 are located onto the outside of the skin 24 of the carcass 25. A first volume 21 is established inside the bung holder 13 towards the skin 24 and is encircling the mandrel 12. A second volume 20 is established outside the skin 24 of the carcass 25 and between the bung holder 13 and the drilling tube 11, where the drilling tube 11 surrounds the bung holder 13, hereby the second volume 20 encircles the bung holder 13 and part of the mandrel 12. There is no openings in the bung holder 13 between the first volume and the second volume where fecal matter 22 can pass, and hereby the first volume 21 and the second volume 20 are separated from each other. The mandrel 12 comprises an open inner volume 28 and openings 15 located in the mandrel 12 in the area where the mandrel is inside the bung holder 13 and where the bung holder makes up the first volume 21 by getting in contact with the outer side of the skin 24 of a carcass. A vacuum creating system (not illustrated) is part of the bung driller and is configured and controlled to make a vacuum inside the second volume 20 and/or inside the inner volume 28 of the mandrel, which is in communication with the first volume 21 due to openings in the mandrel 12 hereby also establishing a vacuum inside the first volume 21. Bung drillers may be designed without or with the inner volume 28 of the mandrel 12, such that the bung driller may be capable of producing vacuum only in the second volume 20; only in the first volume 21 or in both the first volume 21 and in the second volume 20. Fecal matter 22 is illustrated by small dots inside the intestine/rectum end 23 and in the first volume 21 established by the bung holder 13. Some of the functions of the bung holder 13 is as described in relation to FIG. 8. With the vacuum creating system it is possible to create vacuum by sucking air in the direction indicated by the arrows 27 inside the second volume 20 and/or inside the inner volume 28 of the mandrel 12 which also creates a vacuum inside the first volume 21 due to the openings 15 in the mandrel 12.

The bung holder 13 holds the skin 24 around the anal opening in position as described in respect of FIG. 8. By the vacuum created in the second volume 21 and the inner volume 28 of the mandrel 12, fecal matter 22 can be removed from the second volume 21 through the inner volume 28 of the mandrel 12 and be removed from the bung driller. The vacuum in the second volume 20 creates a counterhold on the skin 24 as explained in respect of FIG. 8. The bung drilling system hereby makes it possible to perform the counterhold on the skin 24 created by vacuum inside the second volume 20 to minimize the effect of the forces made by the drilling tube 11 during the drilling process and at the same time reducing by the bung holder 13 the skin 24 area in risk of being contaminated by fecal matter 22 and also removing at least part of the fecal matter 22 located in the first volume 21 by the vacuum established in the inner volume 28 and thus in the first volume 21.

Figure 10:
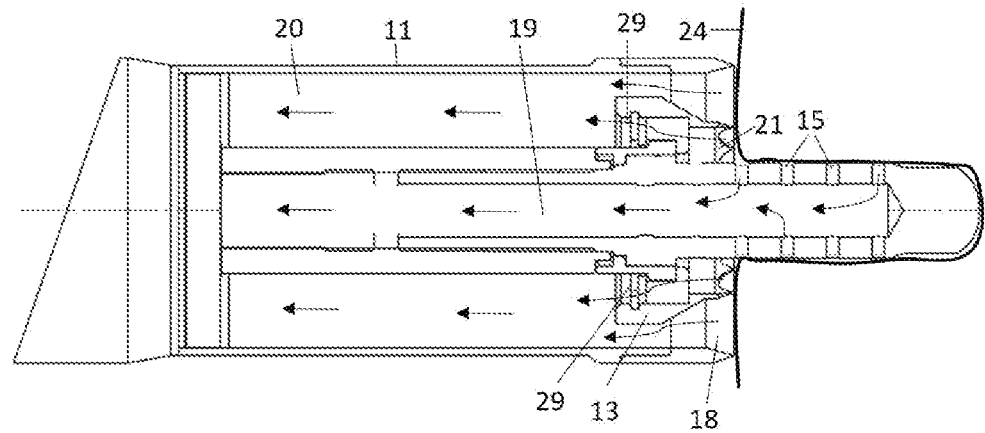
FIG. 10 illustrates vacuum established in the bung driller and the direction of the air being vacuumed.

FIG. 10 illustrates an embodiment of a bung driller where no openings in the mandrel are located inside the bung holder 13. Openings 15 are only located in front of the bung holder 13 i.e. in the part getting in contact with the rectal end of an animal. The bung driller is located with the mandrel inside the rectal end of an animal. Just prior to and during the cutting process, the skin 24 will be vacuumed towards the cutting blade 18 and the bung holder 13 establishing a closed first volume 21 inside the bung holder 13 and a closed second volume 20 inside the drilling tube, the second volume 20 surrounding the mandrel. Here 'closed' means the skin closes the open end of the bung holder 13 and of the drilling tube 11. Suction means (not illustrated) connected at the base part of the drilling tube 11 creates a vacuum in the volume 19 inside the mandrel hereby aspirating air through the openings 15 located inside the rectal end and the air is aspirated through the mandrel 19. Air located in the second volume 20 around the mandrel is aspirated by suction means (not illustrated) away from the front end of the bung driller. Air inside the first volume 21 is aspirated through valves 29 and into the second volume 20 and away. The arrows indicate the way the air is being aspirated. In this embodiment no openings are located between the second volume 20 and the volume 19 inside the mandrel.

Figure 11:
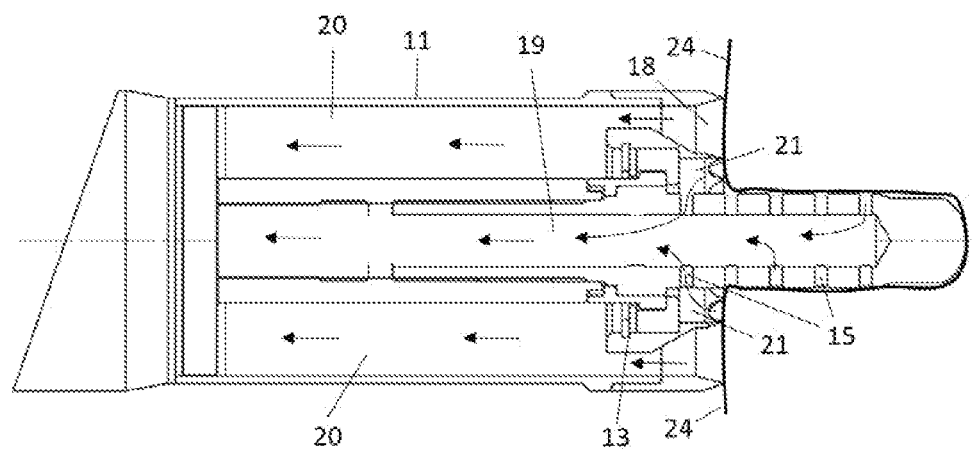
FIG. 11 illustrates another way vacuum can be established in the bung driller and the direction of the air being vacuumed.

FIG. 11 illustrates an embodiment of a bung driller where openings 15 are located in the mandrel inside of the bung holder 13 between the volume 19 and the first volume 21. Suction means (not illustrated) connected at the base part of the drilling tube 11 creates a vacuum in the volume 19 inside the mandrel hereby aspirating air through the openings 15 located inside the rectal end and the air is aspirated through the mandrel 19. Air inside the first volume 21 is aspirated through openings 15 located inside the bung holder 13 and into the volume 19 inside the mandrel. Air located in the second volume 20 around the mandrel is aspirated by suction means (not illustrated) away from the front end of the bung driller. The arrows indicate the way the air is being aspirated. In this embodiment no openings are located between the second volume 20 and the volume 19 inside the mandrel.

Figure 12:
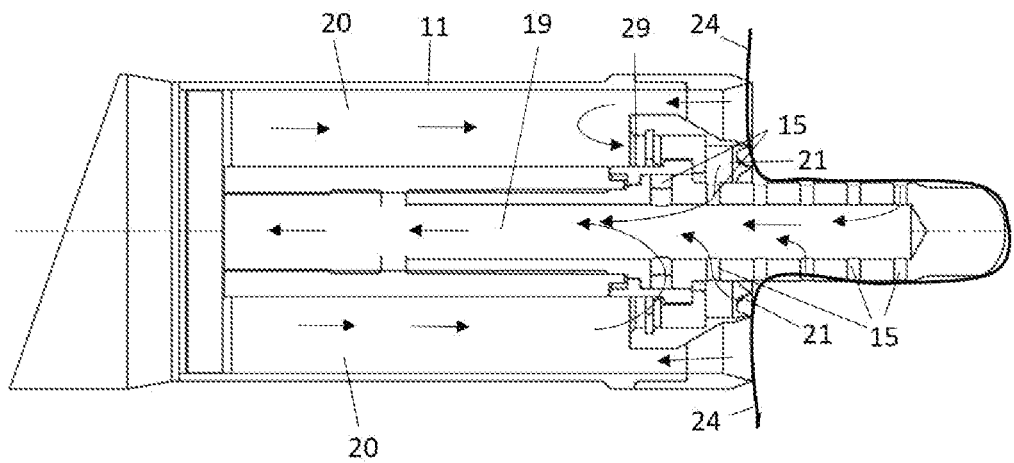
FIG. 12 illustrates yet another way vacuum can be established in the bung driller and the direction of the air being vacuumed.

FIG. 12 illustrates yet another way vacuum can be established in the bung driller and the direction of the air being vacuumed. Suction means (not illustrated) connected at the base part of the drilling tube 11 creates a vacuum in the volume 19 inside the mandrel aspirating air through the openings 15 from the rectal end through the mandrel 19 and also aspirating air from inside the first volume 21 through the openings located between the first volume 21 and the volume 19 located inside the mandrel. A valve 29 located between the volume 19 inside the mandrel and the second volume 20 is used to make vacuum within the second volume 20 such that air in the second volume is aspirated through these valves into the volume 19 and away. Air inside the first volume 21 is aspirated through openings 15 located in the bung holder 13 into the volume 19 inside the mandrel and away. The arrows indicate the way the air is being aspirated. It is also possible to make a bung driller only with the openings 15 surrounded by the bung holder 13 i.e. without the openings 15 which as indicated in the Figure get in touch with the inside of the rectal end of the carcass. For such embodiments different flow directions may be established when aspirating air away from the carcass and depending on if only openings are present between the first volume 21 and the volume 19 inside the mandrel, only present between the second volume 20 and the volume 19 inside the mandrel or both of these types of openings are present, and depending on the way the valves 29 are capable of letting air passing.

The invention claimed is:

1. A bung driller for cutting free the anal opening and rectum end of a carcass by cutting around the anal opening and rectum end, the bung driller comprising:
    a longitudinal drilling tube arranged to hold a pressure difference relative to an outside, and with an open cutting end,
    a mandrel centralized inside the drilling tube, and
    a bung holder located inside of the drilling tube and surrounding at least a part of the mandrel.

2. The bung driller according to claim 1, wherein the bung holder has holding means for engaging with the outside of the carcass.

3. The bung driller according to claim 1, wherein the bung holder arranged to rotate around the mandrel and/or arranged to rotate relative to a knife.

4. The bung driller according to claim 1, wherein the bung holder can slide axial within the drilling tube or
    wherein the bung holder and the mandrel together can slide axially within the drilling tube.

5. The bung driller according to claim 1, wherein a part of the bung holder is in contact with the mandrel and the bung holder defines a first volume inside of the bung holder.

6. The bung driller according to claim 1, wherein the mandrel is a hollow circular tube and comprises openings at least in part of a region from a leading end of the mandrel to where the bung holder is in contact with the mandrel.

7. The bung driller according to claim 1, wherein the bung driller further comprising suction means arranged to aspirate air away from inside the mandrel and/or from inside the drilling tube and/or from inside the bung holder.

8. The bung driller according to claim 1, wherein at least one air valve is located in the bung holder between a first volume inside the bung holder and a second volume inside the drilling tube.

9. A method for cutting free the anal opening and rectum end of an animal carcass by cutting around the anal opening and rectum end with a bung driller according to claim 1, the method comprising:
- entering a leading end of a mandrel into an anal opening and the rectum end of an animal carcass,
- creating contact between a bung holder and the skin surrounding the anal opening of the carcass,
- drilling around the anal opening and along a part of the rectum end of the carcass with a cutting blade of the drilling tube,
- at least during the drilling creating a first volume inside the bung holder and creating a second volume inside the drilling tube and outside the bung holder, avoiding feces entering from the first volume into the second volume.

10. The method according to claim 9, wherein vacuum is made inside the mandrel and/or in the second volume inside the drilling tube and/or in the first volume inside the bung holder.

11. The method according to claim 9, wherein by aspirating air out of the mandrel only vacuum is made in the volume inside the mandrel, in the first volume inside the bung holder and in the second volume inside the drilling tube.

12. A bung drilling system comprising:
- a robot with at least one industrial manipulator,
- at least one bung driller according to claim 1 connected to the at least one industrial manipulator,
- at least one vision system for obtaining image data of a carcass in a region of the outside of the anal opening,
- at least one processor for processing obtained image data and configured to compute controlling information based on information including image data,
- at least one controlling device configured for obtaining at least controlling information from the at least one processor, and for controlling the at least one industrial manipulator and the at least one bung driller to process at least one animal carcass.

13. The system according to claim 12, wherein the industrial manipulator is a robot arranged to work in at least two degrees of freedom.

14. The system according to claim 12, further comprising at least one cleaning cabinet for cleaning the bung driller after use.

15. The system according to claim 14, wherein the at least one cleaning cabinet is connected to the at least one industrial manipulator.

* * * * *